(12) United States Patent
Reynolds

(10) Patent No.: US 7,922,434 B2
(45) Date of Patent: *Apr. 12, 2011

(54) LAMINATED NUT WITH CENTER TENSION SLEEVE

(76) Inventor: Richard L. Reynolds, Hilton Head Island, SC (US)

( * ) Notice: Subject to any disclaimer, the term of this patent is extended or adjusted under 35 U.S.C. 154(b) by 146 days.

This patent is subject to a terminal disclaimer.

(21) Appl. No.: 12/486,440

(22) Filed: Jun. 17, 2009

(65) Prior Publication Data

US 2009/0311076 A1    Dec. 17, 2009

Related U.S. Application Data

(63) Continuation-in-part of application No. 11/641,096, filed on Dec. 19, 2006, now Pat. No. 7,670,092.

(60) Provisional application No. 60/751,289, filed on Dec. 19, 2005.

(51) Int. Cl.
*F16B 37/00* (2006.01)

(52) U.S. Cl. ........................ 411/432; 411/437

(58) Field of Classification Search .......... 411/149, 411/155, 156, 285, 276, 277, 278, 432, 433, 411/437, 533, 537, 544, 917
See application file for complete search history.

(56) References Cited

U.S. PATENT DOCUMENTS

| | | | | | |
|---|---|---|---|---|---|
| 1,425,725 | A | * | 8/1922 | Trepier | 411/149 |
| 1,475,907 | A | * | 11/1923 | Volman | 411/433 |
| 1,945,005 | A | * | 1/1934 | Vacher | 411/134 |
| 1,969,223 | A | * | 8/1934 | Kotvis et al. | 411/278 |
| 2,399,107 | A | * | 4/1946 | Eckenbeck et al. | 411/277 |
| 3,058,386 | A | * | 10/1962 | Morrow | 411/511 |
| 3,497,890 | A | * | 3/1970 | Coyle | 470/25 |
| 4,897,006 | A | * | 1/1990 | Blin | 411/368 |
| 5,085,550 | A | * | 2/1992 | Kendrick | 411/432 |
| 7,670,092 | B2 | * | 3/2010 | Reynolds | 411/432 |

* cited by examiner

*Primary Examiner* — Flemming Saether
(74) *Attorney, Agent, or Firm* — Welsh Flaxman & Gitler LLC

(57) ABSTRACT

A laminated nut includes a conical spring, top disc and a conical spring, bottom disc stacked upon each other defining a laminated stack having a common central bore and an outer wrench engaging surface. A generally cylindrical tension sleeve is located in the central bore. The tension sleeve has an outer wall shaped to substantially conform with the shape of the central bore and an inner wall which is threaded. The tension sleeve has a first end and a second end, the first end of the tension sleeve includes an outwardly extending upper flange and the second end includes an outwardly extending bottom flange, the upper flange and the bottom flange are shaped and dimensioned to retain the top disc and the bottom disc in a stacked relation with the tension sleeve fixedly secured to the laminated stack, such that the conical spring discs and tension sleeve rotate together as a unit.

20 Claims, 5 Drawing Sheets

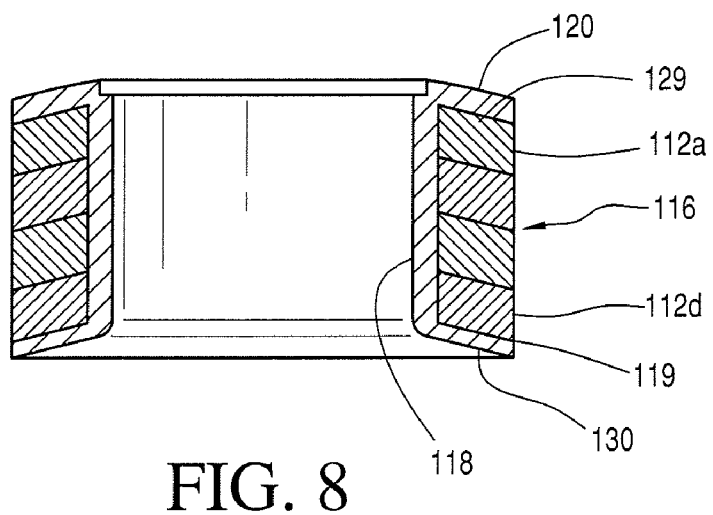
FIG. 8
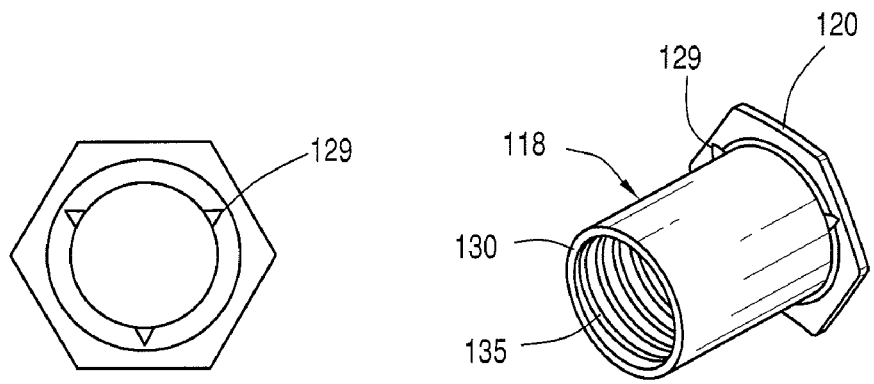
FIG. 9     FIG. 10
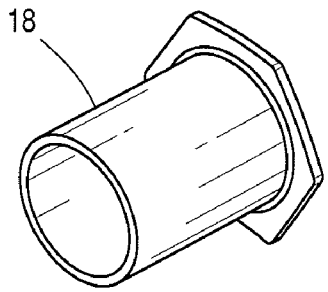    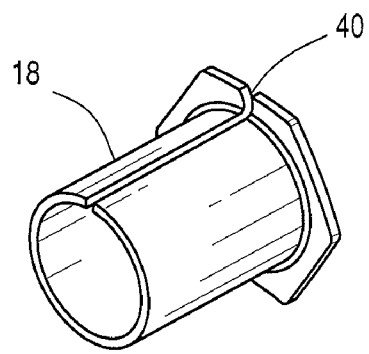
FIG. 11     FIG. 12

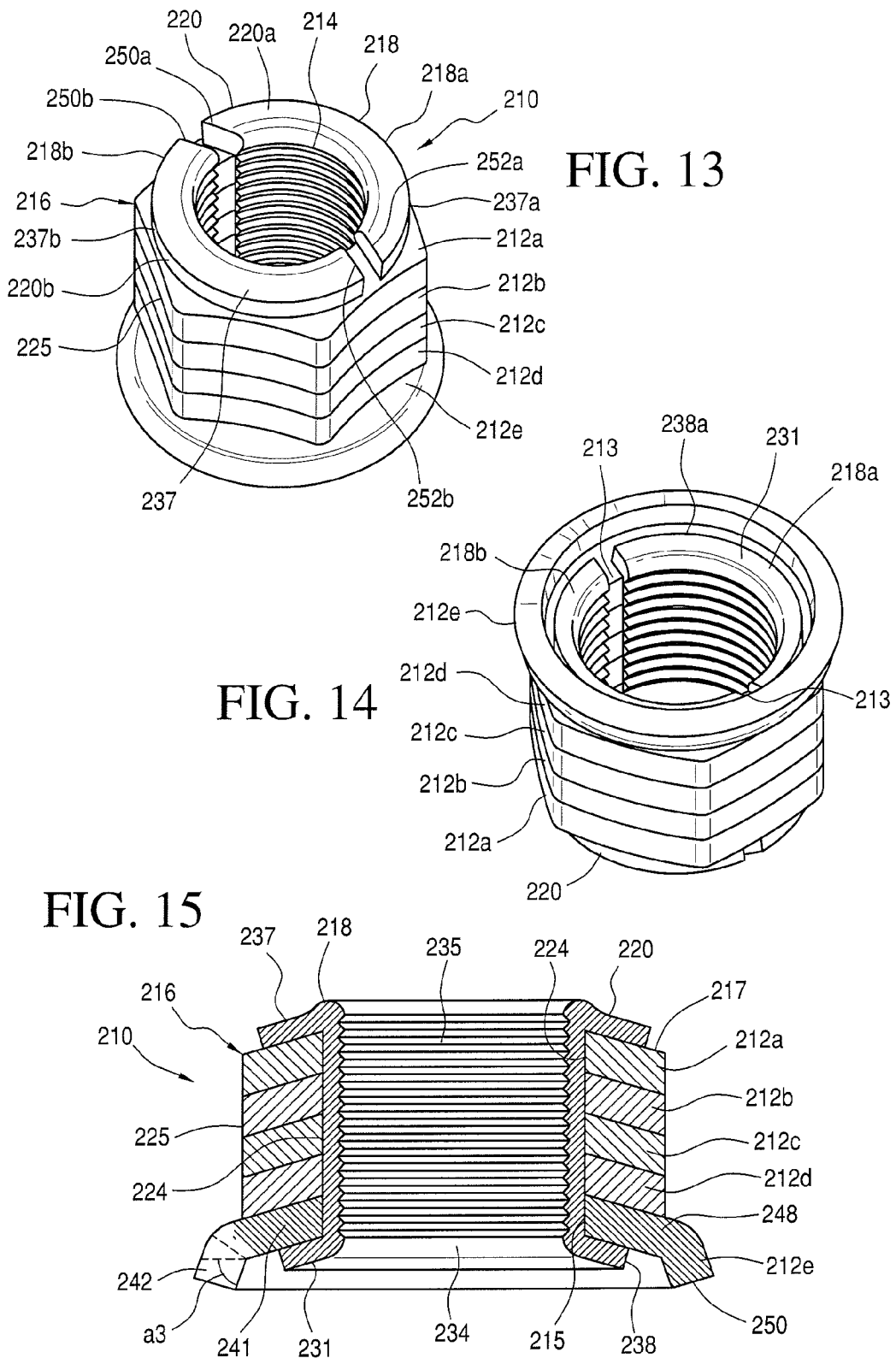

LAMINATED NUT WITH CENTER TENSION SLEEVE

CROSS REFERENCE TO RELATED APPLICATION

This application is a continuation-in-part of U.S. patent application Ser. No. 11/641,096, entitled "LAMINATED NUT WITH CENTER TENSION SLEEVE", filed Dec. 19, 2006 now U.S. Pat. No. 7,670,092, which claims the benefit of U.S. Provisional Patent Application Ser. No. 60/751,289, entitled "LAMINATED NUT WITH CENTER TENSION SLEEVE", filed Dec. 19, 2005.

BACKGROUND OF THE INVENTION

1. Field of the Invention

The present invention relates to laminated nuts for bolts or threaded stud loading and assembly. In particular, the present invention relates to a laminated nut structure having a center threaded tension sleeve.

2. Description of the Prior Art

Conventional hex nut structures create an uneven load concentration when assembled on a mating bolt device. Typically, the load concentration occurs at the lower two to three threads. Conversely, the load concentration on the upper threads is reduced primarily due to dilation of the nut's upper internal diameter as load is placed on the nut, resulting in increased shear forces on the bottom threads. The end result often is loosening of the nut when it is subjected to vibration, leading to ultimate failure of the nut and bolt connection.

In order to overcome the limitations of conventional nut and bolt assemblies, laminated hex nut structures were developed. These structures use a series of laminations with a threaded internal bore to match an associated bolt and a cage holding the parts together. Typically, the nut structures include a bottom plate or washer retained by the cage. Prior art laminated nut structures are disclosed in a series of patents to Reynolds, which are incorporated herein by reference, U.S. Pat. Nos. 4,383,787; 4,900,209; 4,930,962; 4,940,377; 4,984,319; 5,017,079 and 5,049,017. However, a problem with the caged design and threaded laminations is caused by deflection of the laminations under load, this can cause the internal threads to change angle at the point of loading with the bolt. The result can be thread erosion and wear on the bolt or male threads. In addition, reduction of the inside diameter of the laminations contributes to thread erosion. The specific area is the crown of the male thread and root of the female thread. The end result is a compromised nut and bolt assembly, as well as reduced reusability. The conditions related to thread erosion are usually a result of installation over torqueing and the present invention overcomes this problem, as the sleeve type laminated nut of the present invention will support higher loads per thread of engagement.

SUMMARY OF THE INVENTION

In accordance with the present invention, an improved laminated nut structure is provided to eliminate the disadvantages of the prior art. The nut structure of the present invention utilizes a stacked series of conical spring discs formed into a laminated stack with a center tension tube or sleeve that is threaded to conform to a mating bolt structure to ensure reliable bolt loading and connection assembly. The stacked, conical spring disc laminations are hex shaped on the outer periphery to provide wrenching surfaces for nut installation and removal. Although a hex is the desired wrench engaging shape it is readily understood that the outer periphery could take on many different wrench engaging polygonal shapes. A central hole, which is generally non-round, is provided in the laminated stack for the tension sleeve.

The center tension sleeve of the nut structure extends from the top to the bottom of the laminated stack. The sleeve may be contiguous or may use one or a series of slits in a vertical direction between the top and bottom of the nut structure to facilitate inward movement under load. The slits may also be angled. The shape of the outer periphery of the tension sleeve is also generally non-round and conforms to the shape of the central hole in the laminated stack to resist rotation from the wrenching forces applied on the outer hex shape of the laminated stack during loading. The hole in each disc in the laminated stack may include radiused recesses making it non-round. The shape of the outer periphery of the tension sleeve and the shape of the central hole in the laminated stack may take a variety of different shapes to resist rotation between them. The inner periphery of the center tension sleeve is threaded to conform to the threads of a complementary bolt or stud. Tap forming the threads is a method utilizing controlled pressure as opposed to cutting to produce threads in a hole. When used on a round tension sleeve after nut assembly, the tap will cause flowing of the material around the outer periphery of the tension sleeve into the recessed radiused notches in the central hole of the laminate disc to create the non-round anti-rotational feature.

The center tension sleeve also serves as the assembly means for the laminated stack. The sleeve extends completely through and beyond upper and lower edges of the central hole in the laminated stack of discs. The center sleeve is flanged at the top in order to fold over onto the upper disc of the laminated stack and retain the laminated stack between the flange and bottom component, which may be the bottom most spring disc, a free spinning washer or a fixed washer. The bottom of the center sleeve is mechanically attached to the component via a flared out section of the center sleeve to make the nut a solid unit.

To assemble the nut to a correspondingly sized bolt, wrenching forces are applied to the outer hex shaped sides of the laminated stack. The upper flange on the center sleeve provides initial loading from the top to the bottom of the nut. The loading causes the conical shaped spring laminations to deflect; the tension sleeve travels the dimension related to the laminations deflection. Due to the geometry the internal diameter of the bore in the laminate decreases as it is deflected from its conical state toward a flat state. Further, part of the vertical load force is now transferred to the outside walls of the tension sleeve countering the vertical movement of the tension sleeve and reduces loading of the flange, as these load forces are now partially angular or radially applied to the tension sleeve. The increased loading resulting from the wrench torqueing will cause a reduction of the tension sleeve diameter and reduce the designed clearance between the nut and bolt threads. This reduction in thread gap clearance and sidewall pressure combined with the spring characteristics of the conical laminations will act to resist counter rotation. The tension sleeve nut assembly of the present invention, as opposed to other forms of laminated nuts, can contribute complementary bolt stretch characteristics in the bolt-stretch load range. The radial forces on the sleeve at the point of lamination deflection combined with increased friction supports the majority of the bolt loading. It will be appreciated that design of the nut configuration, material used, material thickness and clearance dimensions can be altered and are dictated by desired performance of the nut and bolt assembly.

A primary object of the present invention is the provision of a laminated nut structure that equalizes thread load distribution forces along the bolt and nut mating surfaces.

Another object of the present invention is the provision of a laminated nut structure that minimizes loosening, thread damage and failure of the nut and bolt assembly due to uneven loading of wrenching forces and significantly improves both nut and bolt reuse.

Yet another object of the present invention is to reduce the friction caused by uneven load distribution of the thread loading from bottom to top which is characteristic of solid nuts. The torque-tension relationship uniformity is enhanced and reusability is improved.

Another object of the present invention is the provision of a laminated nut structure that eliminates threads on the laminations stack.

It is an object to use the present invention as a lug nut on vehicles, aerospace, commercial structural, and other general fastening applications.

Other objects and advantages of the present invention will become apparent from the following detailed description when viewed in conjunction with the accompanying drawings, which set forth certain embodiments of the invention.

DESCRIPTION OF THE DRAWINGS

FIG. 8 is a sectional view of a second embodiment of a laminated nut without a separate washer.

FIG. 9 is a plan view of the center tension sleeve shown in FIG. 8.

FIG. 10 is a perspective view of the center tension sleeve shown in FIG. 8.

FIG. 11 is a perspective view of a solid tension sleeve.

FIG. 12 is a perspective view of a split tension sleeve.

FIG. 13 is a top perspective view of a third embodiment.

FIG. 14 is a bottom perspective view of the nut shown in FIG. 13.

FIG. 15 is a sectional view of the laminated nut shown in FIG. 13.

DESCRIPTION OF THE PREFERRED EMBODIMENTS

Figure 1:
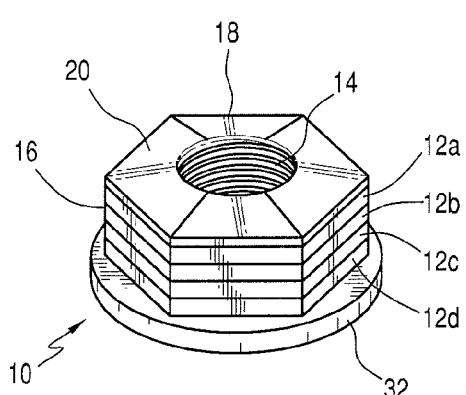
FIG. 1 is a perspective view of a laminated nut in accordance with the present invention.
Figure 2:
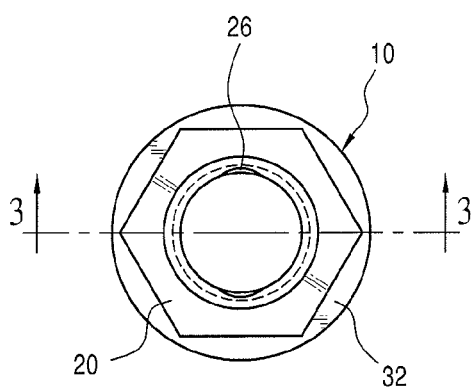
FIG. 2 is a top plan view thereof.
Figure 3:
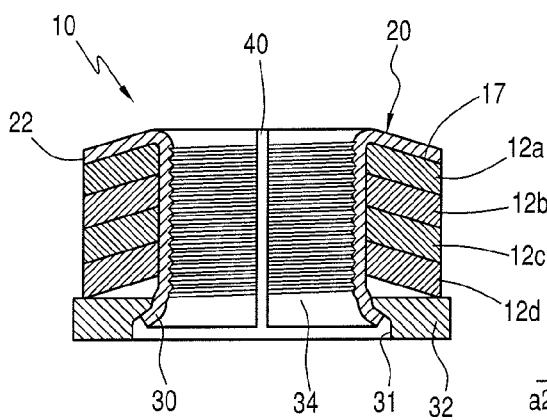
FIG. 3 is a sectional view taken along lines 3-3 of FIG. 2.
Figure 4:
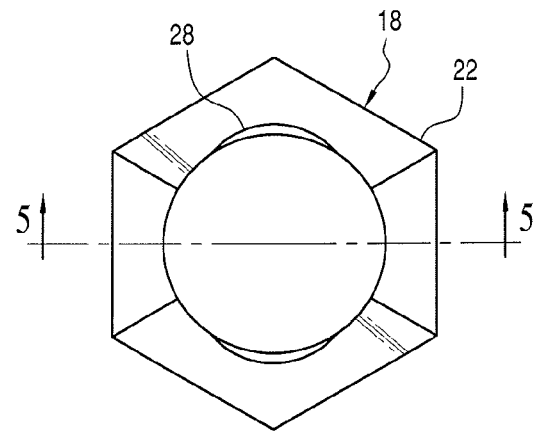
FIG. 4 is a plan view of the center tension sleeve.
Figure 5:
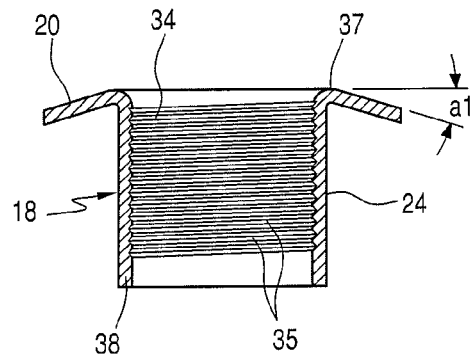
FIG. 5 is a sectional view taken along the lines 5-5 of FIG. 4.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Referring to FIGS. 1 to 7, a laminated nut 10 is disclosed. The laminated nut 10 includes a conical spring, top disc 12a and a conical spring, bottom disc 12d stacked upon each other defining a laminated stack 16 having a common central bore 14 and an outer wrench engaging surface 25. The laminated nut 10 further includes a generally cylindrical tension sleeve 18 located in the central bore 14. The tension sleeve 18 has an outer wall 24 shaped and dimensioned to substantially conform with the shape of said central bore 14 and an inner wall 34 which includes threads 35.

The tension sleeve 18 has a first end 37 and a second end 38. The first end 37 of the tension sleeve 18 includes an outwardly extending upper flange 20 and the second end 38 includes an outwardly extending bottom flange 30. The upper flange 20 and the bottom flange 30 are shaped and dimensioned to retain the top disc 12a and the bottom disc 12d in a stacked relation with the tension sleeve 18 fixedly secured within the laminated stack 16.

More particularly, the laminated nut 10 includes a series of hex-shaped, conical spring discs 12a-d forming a laminated stack 16. While four discs are disclosed in accordance with a preferred embodiment of the present invention, as few as two discs or more than four discs may be used without departing from the spirit of the present invention. Each disc 12a-d includes a central bore or hole and, as such, when the discs 12a-d are stacked in accordance with the present invention they define a central bore 14 of the laminated stack 16.

Each of the discs 12a-d includes an obliquely oriented surface. Specifically, each disc 12a-d is conical in shape and is angled from the horizontal by an angle (a2). The angle can be varied to adjust the spring rate of the disc. It is contemplated that the angle (a2) would be between approximately six and approximately twenty degrees, however, and in accordance with a preferred embodiment, an angle of approximately 18 degrees has been found to be very effective. The cone angle (a2) is dependent on basically the same design criteria as used in the design of conical washers; that is, material thickness; outside diameter; inside diameter; and load requirements. The threaded tension sleeve type laminated nut 10 of the present invention can tolerate a higher cone angle (a2) for each disc than other types of laminated nuts because the disc making up the laminations are not threaded and the loads are distributed in different planes. The greater the angled surface of the disc, the larger will be the force applied to central tension sleeve 18.

The assembled laminated nut 10 includes a threaded central tension tube or sleeve 18. The tension sleeve 18 includes a first end 37 and second end 38. The first end 37 is provided with a rolled over, outwardly extending upper flange 20. The outer edge 22 of the upper flange 20 is hex shaped to correspond with the shape of the hex shaped spring discs 12. The angle (a2) of the conical spring discs 12a-d corresponds to angle (a1) formed by the upper flange 20 and the horizontal line running across the top of the laminated nut 10. Thus, the spring discs 12a-d are able to mate with the upper flange 20 when in an unloaded state.

Once threaded by formed tapping, the outer periphery or wall 24 of the tension sleeve 18 is of a non-round shape that corresponds to the non-round shape of the central bore 14 whereby the tension sleeve 18 is fixedly coupled in the central bore 14 of the laminated stack 16. In the embodiment described above, the non-round shape of the central bore 14 may be formed by including radiused notches 26, best seen in FIG. 6, that correspond to mating projections 28 on the tension sleeve 18 to prevent rotation between the parts. The depth of each notch could be adjusted depending upon the desired use for the nut assembly, however, it is contemplated that the depth would be between 30 to 50% of the thread depth. Further, it is contemplated that various other mating shapes could be formed between the sleeve outer periphery and central bore of the laminated stack, so long as they mate and prevent rotation of one part relative to the other.

The second end 38 of the tension sleeve 18 includes a lower part or portion which is composed of an outwardly extending bottom flange 30 of the tension sleeve 18. In accordance with a preferred embodiment, the bottom flange 30 is mechanically attached to a washer 32 such that the tension sleeve 18 maintains the laminated stack 16 assembled when the upper flange 20 is rolled over against the top surface 17 of the top disc 12a and the bottom flange 30 of the tension sleeve 18 is angled into engagement with the angled bore 31 in the washer 32. The cylindrical inner peripheral wall 34 of the tension sleeve 18 is threaded to match the thread configuration of a bolt (not shown) used in combination therewith. As previously stated, the center tension sleeve 18 is provided with an extended length or portion 30 to facilitate attachment to the washer 32 by bending or flaring the length 30 to form the bottom flange that is in frictional engagement with the angled bore 31 in the washer 32. The washer 32 is then free to spin as the laminated stack 16 is rotated.

Figure 6:
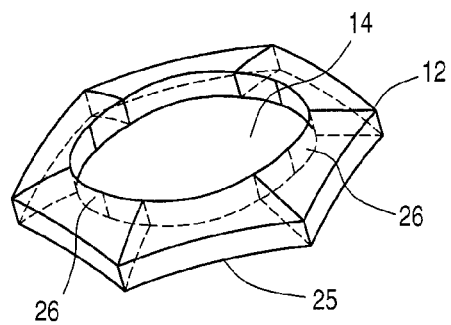
FIG. 6 is a plan view of a conical spring disc.
Figure 7:
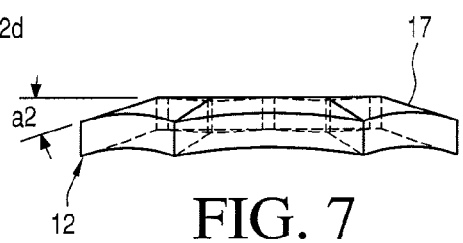
FIG. 7 is a side view of a conical spring disc.
Figure 16:
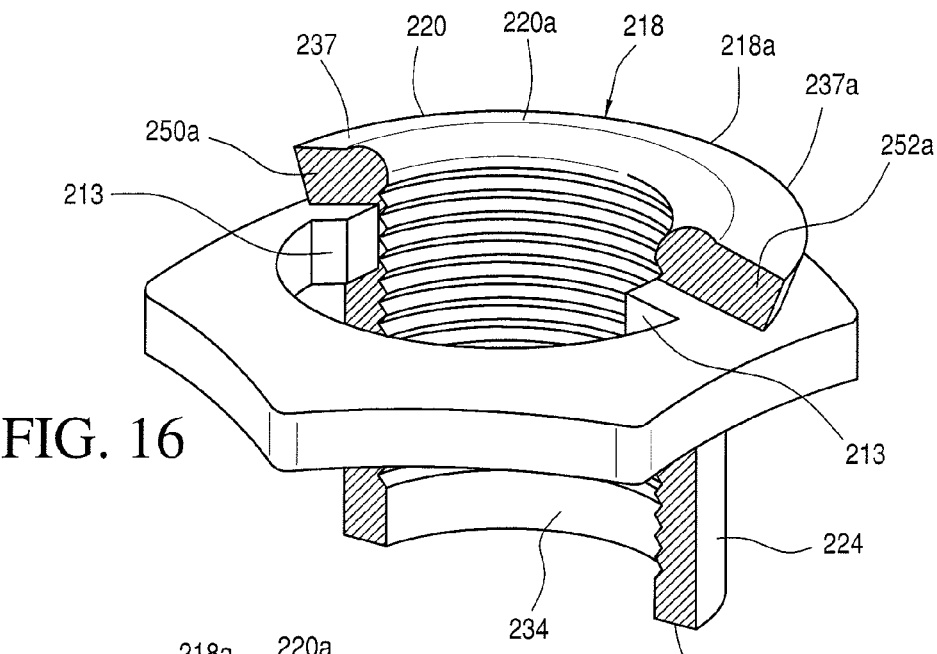
FIG. 16 is a perspective view of a first tension sleeve member with a conical washer positioned thereabout and prior to integration with the conical spring discs so as to form the present nut.

Two basic center tension sleeve structures are contemplated, a solid extruded tube as shown in FIG. 11 and a split tube with a gap 40 as shown in FIG. 12 (both embodiments of the tension sleeve are assigned reference numeral 18 as they are similar parts and may be used interchangeably). The split tube tension sleeve 18 shown in FIG. 12 has a controlled gap size that after assembly with the conical spring discs 12a-d will result in an almost zero size gap. As previously stated, the discs 12a-d would have a non-round inside diameter as best shown in FIG. 6. The tri-lobular configuration shown has three curved notches 26 wherein the apex or center depth of each curved notch or lobe is 30% of the total thread depth on tension sleeve 18. The inward pressure on the tension sleeve 18 created by the discs 12a-d as they flatten out also aids in preventing rotation between the tension sleeve 18 and laminated stack 16. To assemble the laminated nut 10 to a correspondingly sized bolt, wrenching forces are applied to the outer hex shaped sides of the laminated stack 16. The upper flange 20 on the center tension sleeve 18 provides initial loading from the top to the bottom of the laminated nut 10 until the loading forces are transferred to the inner threaded wall 34 of the tension sleeve 18 as a result of the reduction of the diameter of the central bore 14 of the laminated stack 16. Continued torqueing force causes the laminated stack 16 and tension sleeve 18 to move together, deflecting the laminated stack 16. This causes the central bore 14 of the laminated stack 16 to reduce in size and apply force on the outer wall 24 of the tension sleeve 18. The inward radial pressure resulting from the central bore reduction of the laminated stack 16 counters the vertical movement of the tension sleeve 18 and reduces loading on the upper flange 20 of the tension sleeve 18. The radial forces on the tension sleeve 18 at the point of lamination deflection support and equally distribute the majority of the bolt loading along the entire threaded length of the tension sleeve 18. The radial forces on the tension sleeve 18, in the upper range of the bolt loading, reduce thread clearance between the bolt and laminated nut 10 that, in turn, controls resistance to counter rotation and loosening.

In accordance with a second embodiment as shown in FIGS. 8-10, the tension sleeve 118 may be cylindrical and include gussets 129 in the upper flange 120, thus eliminating the need for the outer wall of the sleeve to be non-round. The gussets 129 are shaped and dimensioned to engage the laminate stack 116 to prevent rotation between the tension sleeve 118 and laminate stack 116 formed of conical spring discs 112a-d. This second embodiment is shown not to include the washer 32 disclosed with reference to the embodiment described above, as the outwardly extending bottom flange 130 directly engages the bottom surface 119 of disc 112d and functions to retain the discs 112a-d in their stacked configuration.

The threads 35, 135 in center tension sleeve 18, 118 are preferably tap formed, however, it is contemplated that cut tapping could be used to form the threads. Thread forming taps would function to flow the outer wall material of the tension sleeve into and fill the recesses in the laminations. Thread forming taps have no cutting grooves to cut or remove material in the tapping process. The taps are designed with a series of small lobes on their outer periphery. The taps are hardened and tempered to have very high compressive strength and shock resistance. When form tapping the starting hole size of the nut or solid material is proportionally larger than that used for a cutting tap. The small lobes, several per thread pitch, move the metal through displacement under pressure. The size of the hole is basically the pitch diameter of the thread. Material is displaced outward and inward to form the thread. When you form tap a thin walled tube like the sleeve in the present invention, the sleeve must be first placed in a supporting cavity or the outgoing pressures will expand the walls of the sleeve and the thread will not be fully formed. Another nuance of the tap forming threads will be the creation of a small ring formed in the outer wall of the sleeve by the pressure filling the slight crevices at the edges of each adjoining conical spring disc. Rolled formed threads are stronger because the material is in compression and more accurate than cut threads and have a lower coefficient of friction than cut threads. Thus, tap forming threads is a method of nut tapping without cutting the material and may be used to form the sleeve wall to fill the recessed notches 26 in the laminations inside diameter.

Referring to FIGS. 13 to 20, a laminated nut 210 in accordance with a third embodiment of the present invention is disclosed. The laminated nut 210 includes a conical spring, top disc 212a and a conical spring, bottom disc washer 212e stacked upon each other defining a laminated stack 216 having a common central bore 214 and a polygonal outer wrench engaging surface or circumference 225. The laminated nut 210 further includes a generally cylindrical two piece tension sleeve 218 located in the central bore 214 of the laminated stack 216. The tension sleeve 218 has an outer wall 224 shaped and dimensioned to substantially conform with the shape of said central bore 214 and an inner wall 234 which includes threads 235 when the laminated nut is formed.

Figure 17:
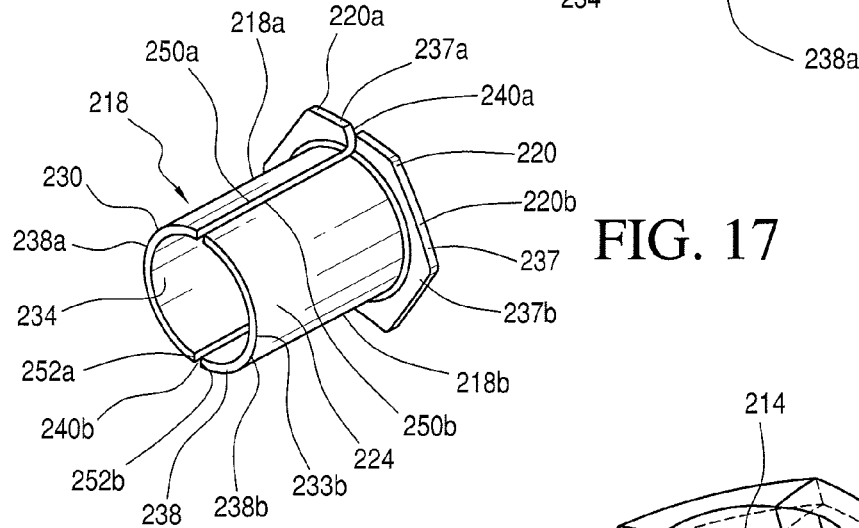
FIG. 17 is a perspective view of a two piece tension sleeve prior to integration with the conical spring discs so as to form the present nut.
Figure 18:
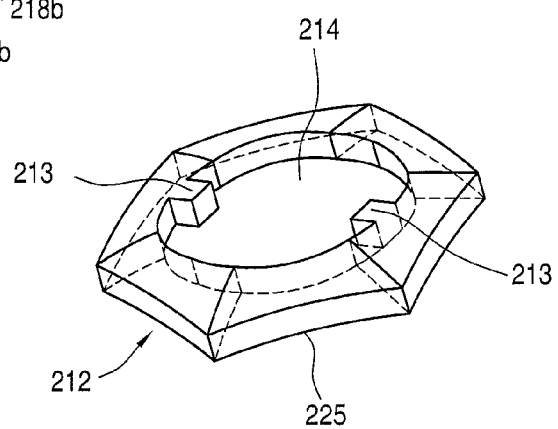
FIG. 18 is a plan view of a conical spring disc in accordance with the third embodiment.
Figure 19:
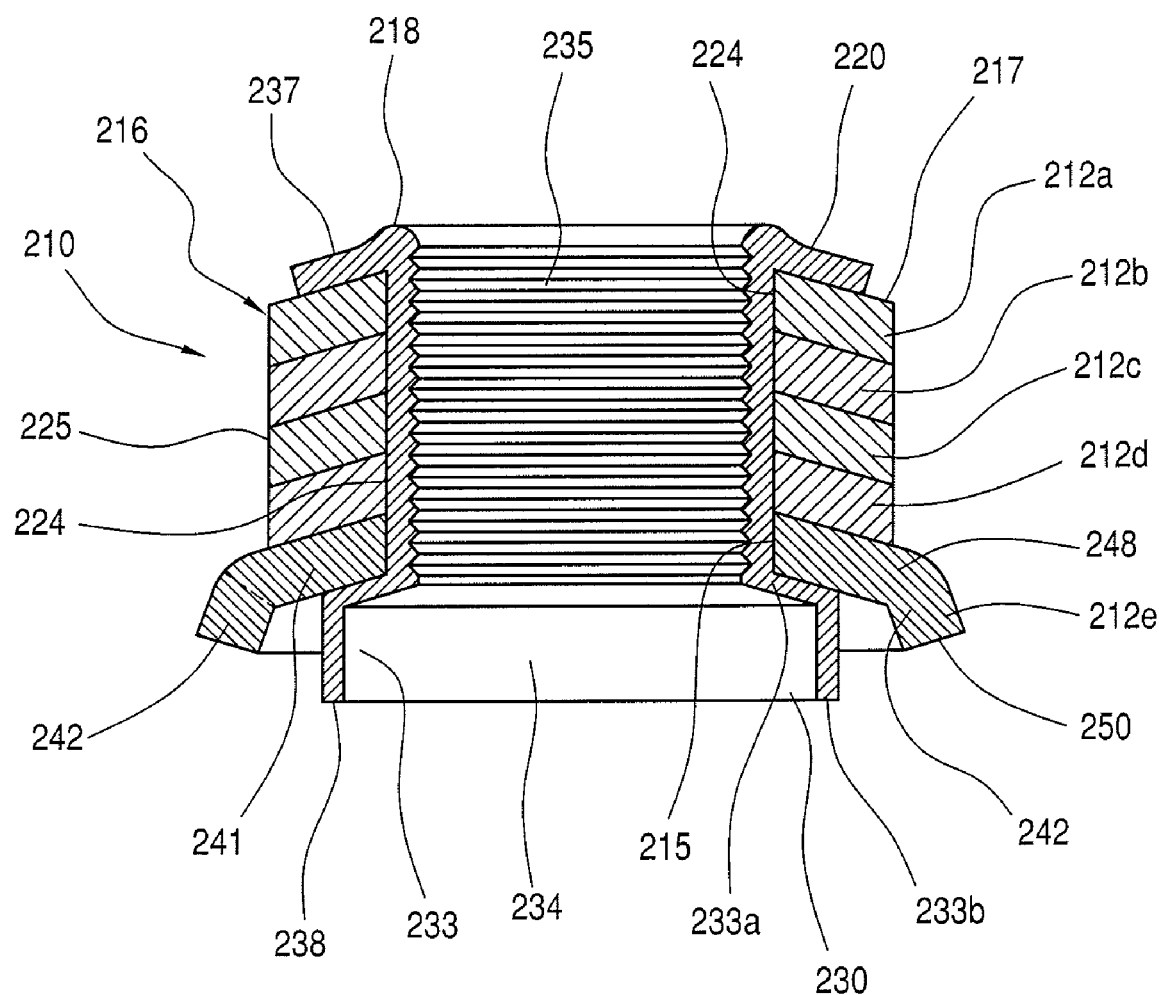
FIG. 19 is a sectional view of the laminated nut wherein the tension sleeve operates as a spacer.

The tension sleeve 218, as shown in FIG. 17, is formed in two parts, that is, a first tension sleeve member 218a and a second tension sleeve member 218b. The tension sleeve 218, as defined by the first tension sleeve member 218a and the second tension sleeve member 218b, includes a first end 237 and a second end 238. The first end 237 of the tension sleeve 218 includes an outwardly extending upper flange 220. In accordance with a preferred embodiment, and with reference to FIGS. 15 and 19, the second end 238 of the tension is fabricated so as to include an extending length 230 which may be selectively formed in two different manners during the manufacturing process for the present nut 210. In accordance with a first embodiment, the extended length 230 at the second end 238 of the tension element 218 is forced outwardly so as to form the bottom flange 231 as shown in FIGS. 14 and 15. In accordance with an alternate embodiment, the extended length 230 is allowed to remain in its extended form so as to function as a flanged spacer 233 as shown in FIG. 19. Referring to the embodiment shown with reference to FIGS. 13-15 & 19, the upper flange 220 and the bottom flange 231 or 233 are shaped and dimensioned to retain the top disc 212a and the bottom disc washer 212e in a stacked relation with the tension sleeve 218 fixedly secured within the laminated stack 216 to rotate together as a unit.

When held within the central bore 214 of the laminated stack 216 with the outer wall 224 of the tension sleeve 218 in engagement with the inner wall 215 of the central bore 214, the edges of the first tension sleeve member 218a and the second tension sleeve member 218b are separated by a small space into which a projection 213 of the laminated stack 216 fits for integrating the stack 216 with the tension sleeve 218. With this in mind, the first tension sleeve member 218a is constructed in the following manner. The first tension sleeve member 218a includes a first end 237a and a second end 238a. The first end 237a of the first tension sleeve member 218a includes an outwardly extending upper flange 220a. The second end 238a of the first tension sleeve member 218a includes an outwardly extending length which is formed into a portion of bottom flange 231 as shown with reference to the embodiment disclosed in FIGS. 13-15 or, and in accordance with an alternate embodiment, may be of an extended length to function as a portion of the flanged spacer 233 as shown with reference to the embodiment disclosed in FIG. 19. The upper flange 220a and the bottom flange 231 are shaped and dimensioned to retain the top disc 212a and the bottom disc washer 212e in a stacked relation with the tension sleeve 218 fixedly secured within the laminated stack 216.

The first tension sleeve member 218a also includes a substantially semi-circular cross sectional configuration when viewed along a plane extending perpendicular to the longitudinal axis of the tension sleeve 218. Accordingly, the first tension sleeve member 218a includes a first lateral edge 250a and a second lateral edge 252a with the concave cross sectional extent of the first tension sleeve member 218a extending therebetween The second tension sleeve member 218b includes a first end 237b and a second end 238b. The first end 237b of the second tension sleeve member 218b includes an outwardly extending upper flange 220b. The second end 238b of the second tension sleeve member 218b includes an outwardly extending length 230 which is formed into a portion of the bottom flange 231 as shown with reference to the embodiment disclosed in FIGS. 13-15 or, and in accordance with an alternate embodiment, may be of an extended length to function as a portion of the spacer 233 as shown with reference to the embodiment disclosed in FIG. 19. The upper flange 220b and the bottom flange 231b are shaped and dimensioned to retain the top disc 212a and the bottom disc washer 212e in a stacked relation with the tension sleeve 218 fixedly secured within the laminated stack 216.

The second tension sleeve member 218b also includes a substantially semi-circular cross sectional configuration when viewed along a plane extending perpendicular to the longitudinal axis of the tension sleeve 218. Accordingly, the second tension sleeve member 218b includes a first lateral edge 250b and a second lateral edge 252b with the concave cross sectional extent of the second tension sleeve member 218b extending therebetween.

More particularly, the laminated nut 210 includes a series of polygonal shaped, preferably hex-shaped, conical spring discs 212a-d and disc washer 212e forming a laminated stack 216. While five discs are disclosed in accordance with a preferred embodiment of the present invention, as few as two discs or more than five discs may be used without departing from the spirit of the present invention. Each disc 212a-e includes a central bore or hole and, as such, when the discs 212a-e are stacked in accordance with the present invention they define a central bore 214 of the laminated stack 216. Further, the inside diameter of each disc includes opposed projections 213. The projections 213 are shaped and dimensioned to fit within the voids 240a, 240b, best shown in FIG. 17, separating the first tension sleeve member 218a from the second tension sleeve member 218b, more particularly, between the first lateral edge 250a of the first tension sleeve member 218a and the first lateral edge 250b of the second tension sleeve member 218b, and between the second lateral edge 252b of the first tension sleeve member 218a and the second lateral edge 252b of the second tension sleeve member 218b. When form tapping to form threads 235 the discs 212a-e and first tension sleeve member 218a and the second tension sleeve member 218b are unified. The tapping causing the projections 213 to fill the voids 240a and 240b between the first tension sleeve member 218a and the second tension sleeve member 218b. With the projections 213 filling the voids 240a, 240b, and the tension sleeve 218 held within the central bore 214 of the laminated stack 216 with the outer wall 224 of the tension sleeve 218 in engagement with the inner wall 215 of the central bore 214, the tension sleeve 218 is effectively locked with the discs 212a-e for rotational movement with the tension sleeve 218.

The top four discs 212a-d are generally identical as shown in FIGS. 13 and 15. As will be appreciate based upon the following disclosure the bottom disc washer 212e is slightly different from the discs positioned above it. Each of the four upper discs 212a-d includes an obliquely oriented surface. Specifically, each disc 212a-e is conical in shape as discussed above.

With reference to the bottom disc washer 212e it is shaped such that when the tension sleeve 218 moves downward as the laminated nut 210 is tightened, the discs 212 are deflected and the bottom disc washer 212e contacts the loaded surface interface preventing the second end 238 of the tension sleeve 218 from ever reaching the loaded surface interface. In fact, the present nuts optimum load occurs at 75% to 90% of the load to flatten the discs 212a-e and provide protection from being over torqued. As a result, measuring the height of a fastened nut in accordance with present invention may be used to evaluate installed load and subsequent in service inspection and load retention. Initial loading of the laminated nut 210 begins at both the top and bottom of the laminated nut 210 and results in more even thread loading top to bottom than a solid nut. High stress at the bottom threads is reduced by this design. Deflection of the discs also reduces the internal diameter of the tension sleeve 218 and designed thread clearance, increasing thread contact area and resulting in higher load capacity and anti-rotational friction.

More particularly, and with reference to FIG. 15, the bottom disc washer 212e includes first and second angled sections 241, 242. Each of the first and second angled sections 241, 242 are annular and include an outer circumference 248, 250, respectively. With reference to the first angled section 241, it is shaped substantially to conform with the four upper discs 212a-d and therefore includes an obliquely oriented surface. Specifically, first angled section 241 is conical in shape and is angled from the horizontal by an angle (a2). As with the four upper discs 212a-d, the angle can be varied to adjust the spring rate of the disc. With regard to the second angled section 242, it also includes an obliquely oriented surface. However, the second angled section 242 is conical in shape and is angled from the horizontal by an angle (a3) which is greater than the angular orientation (a2) of the second angled section 242. As a result, the second angled section 242 extends downwardly from the outer circumference 248 of the first angled section 241 such that the outer circumference 250 of the second angled section 242 is positioned for contact with the loaded surface upon application of the present nut.

As briefly discussed above, the assembled laminated nut 210 includes a threaded central tension tube or tension sleeve 218 formed in two pieces. The tension sleeve 218 includes a first end 237 and second end 238. The first end 237 is provided with a rolled over, outwardly extending upper flange 220. The outer edge of the upper flange 220 may be hex shaped to correspond with the shape of the hex shaped spring discs 212a-e. The angle (a2) of the conical spring discs 212a-d corresponds to angle (a1) formed by the upper flange 220 and the horizontal line running across the top of the laminated nut 210. Thus, the spring discs 212a-d are able to mate with the upper flange 220 when in an unloaded state.

Once threaded by formed tapping, the tension sleeve 218 and discs 212a-e are unified.

The second end 238 of the tension sleeve 218 includes a lower part or portion which is composed of an outwardly extending bottom flange 231 or 233 of the tension sleeve 218. The bottom flange 231 or 233 is directly linked to the bottom surface of the bottom disc washer 212e such that the tension sleeve 218 maintains the laminated stack 216 assembled when the upper flange 220 is rolled over against the top surface 217 of the top disc 212a and the bottom flange 231 or 233 of the tension sleeve 218 is angled into engagement with the bottom surface of the bottom disc washer 212e.

A cylindrical inner peripheral wall is formed when thread tapping, which is composed of the tension sleeve 218 and projections 213 being unified as the projections flow to fill voids 240a and 240b. The formed cylinder is threaded to match the thread configuration of a bolt (not shown) used in combination therewith. As previously stated, the center tension sleeve 218 is provided with an extended length or portion 230 to facilitate attachment to the bottom surface of the bottom disc washer 212e by bending or flaring the length 230 to form the bottom flange 231 that is in frictional engagement with the angled bore in the bottom disc washer 212e or alternative the extended length 230 is bent such that an offset portion 233a contacts the bottom disc washer 212e and a downwardly extending second portion 233b extends therefrom along an axis substantially parallel to that of the remainder of the tension sleeve 218. The downwardly extending portion 233b is straight and functions as a spacer. The spacer is designed to reduce the wheel hub hole size, that is, the spacer fits into the hole thereby reducing the diameter of the hole. The holes in heavy duty tractor-trailer wheel hubs are designed with larger holes to accommodate assembly of the wheel to the hub. The larger holes are a significant cause of wheel nuts loosening. Spacers are currently used, however, the present combination of a nut and spacer will save labor and the loss of spacers.

The offset portion 233a functioning as a bottom flange for the nut 210. The inside diameter of the spacer portion 233b is larger than the stud or bolt size onto which the assembly is to be fitted. The wall thickness of downwardly extending second portion 233b is thinner than the threaded portion 235 of sleeve 218. This is preferably accomplished in a coining operation as the first and second tension sleeve members 218a, 218b are stamped in the die. The offset portion 233a is set vertically in an assembly die, and the bottom large washer 212e added. The four conical washers 212a-d are then added, and a punch supports the bottom of the assembly at the offset portion 233a. The upper flange 220a, 220b is then forced downwardly and formed so as to conform with the upper surface of the conical disc 212a. Tapping is then performed from the bottom.

The spring discs, tension sleeve and washer may be made of various materials such as high carbon steel, medium carbon steel, stainless steel or steel alloy. It also would be possible to make sleeves of non-corrosive materials for special applications such as electrical conductivity or reduction of electrolysis.

It will be appreciated that changes, variations and modifications may be made to the laminated nut structure of the present invention without departing from the spirit and scope of the present invention.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A laminated nut, comprising:
a conical spring, top disc and a conical spring, bottom disc stacked upon each other defining a laminated stack having a common central bore and a polygonal shaped outer wrench engaging surface;
a generally cylindrical tension sleeve located in said central bore, the tension sleeve having an outer wall shaped to substantially conform with the shape of said central bore and an inner wall which is threaded;
said tension sleeve having a first end and a second end, the first end of the tension sleeve including an outwardly extending upper flange and the second end including an outwardly extending bottom flange, the upper flange and the bottom flange being shaped and dimensioned to retain the top disc and the bottom disc in a stacked relation with the tension sleeve fixedly secured to the laminated stack, such that the conical spring discs and tension sleeve rotate together as a unit.

2. The laminated nut according to claim 1, further including a washer positioned between the bottom flange and the bottom disc of the laminated stack.

3. The laminated nut according to claim 1, further including at least one conical spring disc positioned between the top disc and the bottom disc.

4. The laminated nut according to claim 3, further including a plurality of conical spring discs positioned between the top disc and the bottom disc.

5. The laminated nut according to claim 1, wherein the central bore of the laminated stack is non-round.

6. The laminated nut according to claim 5, wherein the central bore includes curved radiused areas about its circumference.

7. The laminated nut according to claim 6, wherein the threads along the inner wall of the tension sleeve are form tapped and force material into the radiused areas.

8. The laminated nut according to claim 1, wherein the tension sleeve is split along its length.

9. The laminated nut according to claim 1, wherein the upper flange includes gussets.

10. The laminated nut according to claim 1, wherein the tension sleeve is a cylindrical two piece tension sleeve composed of a first tension sleeve member and a second tension sleeve member having opposed edges.

11. The laminated nut according to claim 10, wherein edges of the first tension sleeve member and the second tension sleeve member are separated by voids into which a projection of the laminated stack fits for integrating the laminated stack with the tension sleeve.

12. The laminated nut according to claim 10, wherein the first tension sleeve member also includes a substantially semi-circular cross sectional configuration when viewed along a plane extending perpendicular to a longitudinal axis of the tension sleeve and the second tension sleeve member also includes a substantially semi-circular cross sectional configuration when viewed along a plane extending perpendicular to a longitudinal axis of the tension sleeve.

13. The laminated nut according to claim 12, wherein the outwardly extending bottom flange includes an offset portion and a downwardly extending second portion extending therefrom along an axis substantially parallel to that of the remainder of the tension sleeve.

14. The laminated nut according to claim 13, wherein the second portion is spacer and extends straight from the offset portion.

15. The laminated nut according to claim 1, wherein the conical spring, bottom disc is shaped to extend below the second end of the tension sleeve.

16. The laminated nut according to claim 15, wherein the conical spring, bottom disc includes a first angled section and a second angled section.

17. The laminated nut according to claim 16, wherein the first angled section is conical in shape and is angled from the horizontal by an angle (a2), and the second angled section is conical in shape and is angled from the horizontal by an angle (a3) which is greater than the angular orientation (a2) of the second angled section.

18. A laminated nut, comprising:
a conical spring, top disc and a conical spring, bottom disc stacked upon each other defining a laminated stack having a common central bore and a outer wrench engaging surface, the conical spring disc including projections;
a two-piece tension sleeve located in said central bore, the tension sleeve having a first tension sleeve member and a second tension sleeve member having opposed edges and an outer wall shaped to substantially conform with the shape of said central bore and an inner wall which is threaded;
the tension sleeve having a first end and a second end, the first end of the tension sleeve including an outwardly extending upper flange and the second end including an outwardly extending bottom flange, the upper flange and the bottom flange being shaped and dimensioned to retain the top disc and the bottom disc in a stacked relation with the tension sleeve fixedly secured to the laminated stack, such that the conical spring discs and tension sleeve rotate together as a unit; and
wherein the edges of the first tension sleeve member and the second tension sleeve member are separated by voids into which the projections of the conical spring discs fit for integrating the laminated stack with the tension sleeve.

19. The laminated nut according to claim 18, wherein the outwardly extending bottom flange includes an offset portion and a downwardly extending second portion extending therefrom along an axis substantially parallel to that of the remainder of the tension sleeve.

20. The laminated nut according to claim 19, wherein the second portion is spacer and extends straight from the offset portion.

* * * * *